J. PEACE & W. P. COX.
Screw-Cutting Machines.

No. 141,234.  Patented July 29, 1873.

UNITED STATES PATENT OFFICE.

JOHN PEACE, OF MERCHANTVILLE, AND WILLIAM P. COX, OF CAMDEN, NEW JERSEY.

IMPROVEMENT IN SCREW-CUTTING MACHINES.

Specification forming part of Letters Patent No. 141,234, dated July 29, 1873; application filed July 20, 1872.

*To all whom it may concern:*

Be it known that we, JOHN PEACE, of Merchantville, Camden county, State of New Jersey, and WILLIAM P. COX, of the city and county of Camden, State of New Jersey, have invented an Improved Screw-Cutting Die, of which the following is a specification:

The object of our invention is a readily-adjustable die wherewith to cut screw-threads on tubes and bolt-blanks of different diameters.

Figure 1:
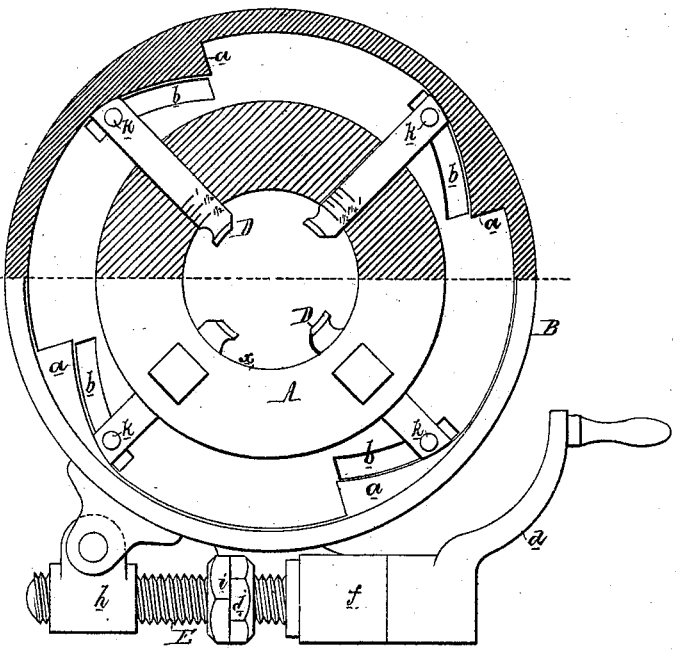
Figure 2:
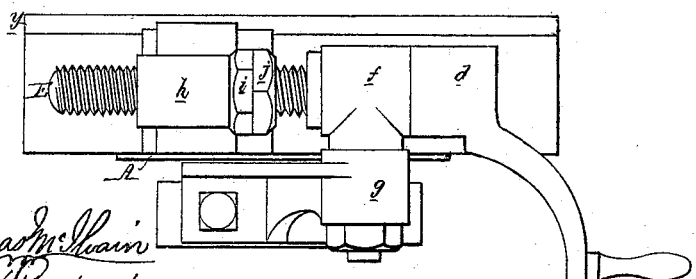

Our screw-cutting die is illustrated partly in section in Figure 1, in which A represents the fixed or stationary body or hub of the die, to which is fitted snugly, but so as to turn freely, a flanged ring, B, having internal cam-like projections $a$ and cam-like recesses $b$ for controlling a series of radially-arranged chasers, D, so adapted to the fixed hub A that they can be moved to and fro thereon, the adjustment of the ring being effected by a screw, E, provided with a crank, $d$, and adapted to a bearing, $f$, on the fixed portion of the die, and to a nut, $h$, attached to the ring, both nut and bearing being pivoted in the manner shown in Fig. 1, and in the edge view, Fig. 2, so as to be self-accommodating to the different angles assumed by the screw. The extent of the movement of the screw, and consequently that of the ring and chasers, is determined by means of a nut, $i$, and jam nut or nuts $j$, with which the said screw is provided.

Figure 3:
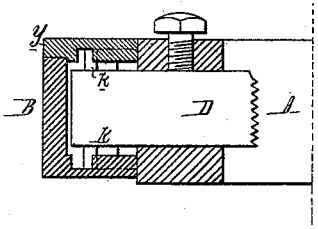

If a pipe or bolt of, say, an inch and a quarter in diameter has to be threaded, the chasers are forced inward by a movement of the screw and ring until the one-and-a-quarter-inch graduations marked upon the chasers are exactly on line with the inner edge $x$ of the fixed hub A of the die. The nut $i$ is then set up to the nut $h$, and then secured by the jam-nut $j$, as shown in Fig. 2. The pipe or bolt, while revolving, is then subjected to the die and threaded in the usual manner, after which the chasers are simultaneously moved outward, and the pipe or bolt withdrawn; this outward movement of the chasers being accomplished by the action of the cam-like grooves $b$ in the ring B, and those in the cover $y$ (see Figs. 1 and 3) on the pins $k$ of the chasers, when the said ring is turned by operating the screw E, the movement of which in the contrary direction is arrested by the nut $i$ when the chasers have arrived at the proper position for threading a bolt or pipe of the same diameter as that first threaded. If a pipe or bolt of different size has to be threaded, however, the nuts $i$ and $j$ are so adjusted as to permit a greater or less inward movement of the chasers, according to the diameter of the pipe or bolt.

The internal cam-like projections $a$ of the movable ring afford a solid end bearing for the chasers, and serve as positive mediums for the simultaneous inward adjustment of the same to the extent permitted by the nut $i$ of the screw E, the outward movement of the chasers being accomplished, as before remarked, by the action of the edges of the grooves $b$ in the ring and cover $y$ on the pins $k$ of the chasers.

The screw E with its lock-nut is an important feature of our invention, as it serves the twofold purpose of an expanding and contracting medium for the die, when the latter is required to operate upon a number of tubes or bolts of the same diameter in succession, and also as a medium for adjusting the die when pipes or bolts of different diameters have to be threaded.

We claim—

The combination, with the ring B and screw E, of an adjustable stop nut or nuts, for the purpose described.

In testimony whereof we have signed our names to this specification in the presence of two subscribing witnesses.

JOHN PEACE.
WILLIAM P. COX.

Witnesses:
WM. A. STEEL,
HARRY W. DOUTY.